United States Patent
Kline et al.

(10) Patent No.: US 10,944,320 B2
(45) Date of Patent: Mar. 9, 2021

(54) EFFICIENT ON-CHIP HIGH-VOLTAGE DRIVER CIRCUIT FOR ULTRASONIC TRANSDUCER

(71) Applicant: Chirp Microsystems, Inc., Berkeley, CA (US)

(72) Inventors: Mitchell Kline, Berkeley, CA (US); Richard Przybyla, Berkeley, CA (US); David Horsley, Berkeley, CA (US)

(73) Assignee: CHIRP MICROSYSTEMS, INC., Berkeley, CA (US)

( * ) Notice: Subject to any disclaimer, the term of this patent is extended or adjusted under 35 U.S.C. 154(b) by 517 days.

(21) Appl. No.: 15/958,415

(22) Filed: Apr. 20, 2018

(65) Prior Publication Data

US 2018/0248477 A1    Aug. 30, 2018

Related U.S. Application Data

(63) Continuation of application No. PCT/US2016/057972, filed on Oct. 20, 2016.

(60) Provisional application No. 62/244,574, filed on Oct. 21, 2015.

(51) Int. Cl.
| | |
|---|---|
| *H02M 1/00* | (2006.01) |
| *H02M 3/07* | (2006.01) |
| *H02M 7/483* | (2007.01) |
| *B06B 1/02* | (2006.01) |
| *H02M 1/08* | (2006.01) |
| *H02M 1/36* | (2007.01) |

(52) U.S. Cl.
CPC ............. *H02M 3/07* (2013.01); *B06B 1/0207* (2013.01); *H02M 1/08* (2013.01); *H02M 1/36* (2013.01); *H02M 7/483* (2013.01); *H02M 2001/007* (2013.01); *H02M 2001/0048* (2013.01); *Y02B 70/1491* (2013.01)

(58) Field of Classification Search
CPC combination set(s) only.
See application file for complete search history.

(56) References Cited

U.S. PATENT DOCUMENTS

| | | | |
|---|---|---|---|
| 7,351,204 | B2 | 4/2008 | Amemiya |
| 7,388,422 | B2 | 6/2008 | Khan et al. |
| 8,147,409 | B2* | 4/2012 | Shifrin ............... G10K 11/346 600/437 |
| 8,829,980 | B2 | 9/2014 | Siragusa et al. |
| 9,233,254 | B2* | 1/2016 | Nimmagadda ........ A61N 1/378 |

(Continued)

FOREIGN PATENT DOCUMENTS

| | | |
|---|---|---|
| EP | 1932479 A1 | 6/2008 |
| EP | 2633621 A1 | 9/2013 |

OTHER PUBLICATIONS

International Search Report and Written Opinion dated Jan. 30, 2017 for International Patent Application No. PCT/US2016/057972.

(Continued)

*Primary Examiner* — Krystine E Breier
(74) *Attorney, Agent, or Firm* — JDI Patent; Joshua D. Isenberg; Robert Pullman (57) ABSTRACT

An ultrasound transducer may be driven by a driver circuit having one or more charge pumps and a multi-level inverter. The one or more charge pumps are configured to drive the ultrasound transducer only during output transitions of the inverter.

17 Claims, 5 Drawing Sheets

(56) References Cited

U.S. PATENT DOCUMENTS 9,853,617 B2 * 12/2017 Sautto ................ H03F 3/45264

OTHER PUBLICATIONS

"Ultrasonic Imaging Transceiver Design for CMUT: A Three-Level 30-Vpp Pulse-Shaping Pulser With Improved Efficiency and a Noise-Optimized Receiver", Published in: IEEE Journal of Solid-State Circuits ( vol. 48, Issue: 11 , Nov. 2013), pp. 2734-2745, Date of Publication: Aug. 16, 2013; INSPEC Accession No. 13852159; DOI: 10.1109/JSSC.2013.2274895; Publisher: IEEE.
Extended Search Report dated Apr. 29, 2019 for European Patent Application 16858243.5.

* cited by examiner

EFFICIENT ON-CHIP HIGH-VOLTAGE DRIVER CIRCUIT FOR ULTRASONIC TRANSDUCER

CLAIM OF PRIORITY

This Application is a continuation of International Patent Application Number PCT/US2016/057972, filed Oct. 20, 2016, the entire contents of which are incorporated herein by reference. International Patent Application Number PCT/US2016/057972 claims the priority benefit of U.S. Provisional Patent Application No. 62/244,574 filed Oct. 21, 2016, the entire contents of which are incorporated herein by reference.

Notice of Material Subject to Copyright Protection

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE DISCLOSURE

The present disclosure is related to ultrasonic transducers and more particularly to driving circuitry for ultrasound transducers.

BACKGROUND

Ultrasonic transducers typically require high voltage drive levels in order to produce sufficient output power. The transducers are typically driven with a square wave produced by an inverter. In many applications, it is undesirable or impractical to generate the necessary high voltages and associated level shifters for the inverter at the system level. Additionally, the transducers present a large capacitive load to driving circuitry that can lead to high power dissipation. It is important that the driving circuitry, including high voltage generation, is very efficient to minimize the power required.

According to aspects of the present disclosure a charge pump may be integrated with a multi-level inverter on a single chip to address the above issues. Charge pump design and control may be optimized for the application to maximize the efficiency and eliminate the need for off-chip components.

BRIEF SUMMARY

An ultrasound transducer may be driven by a driver circuit in the form of an integrated circuit coupled to the ultrasound transducer. The integrated circuit may include one or more charge pumps and a multi-level inverter. The charge pumps may be configured such that they are active only when required to supply the high voltage transmit waveform applied to the ultrasound transducer.

DETAILED DESCRIPTION

Figure 1:
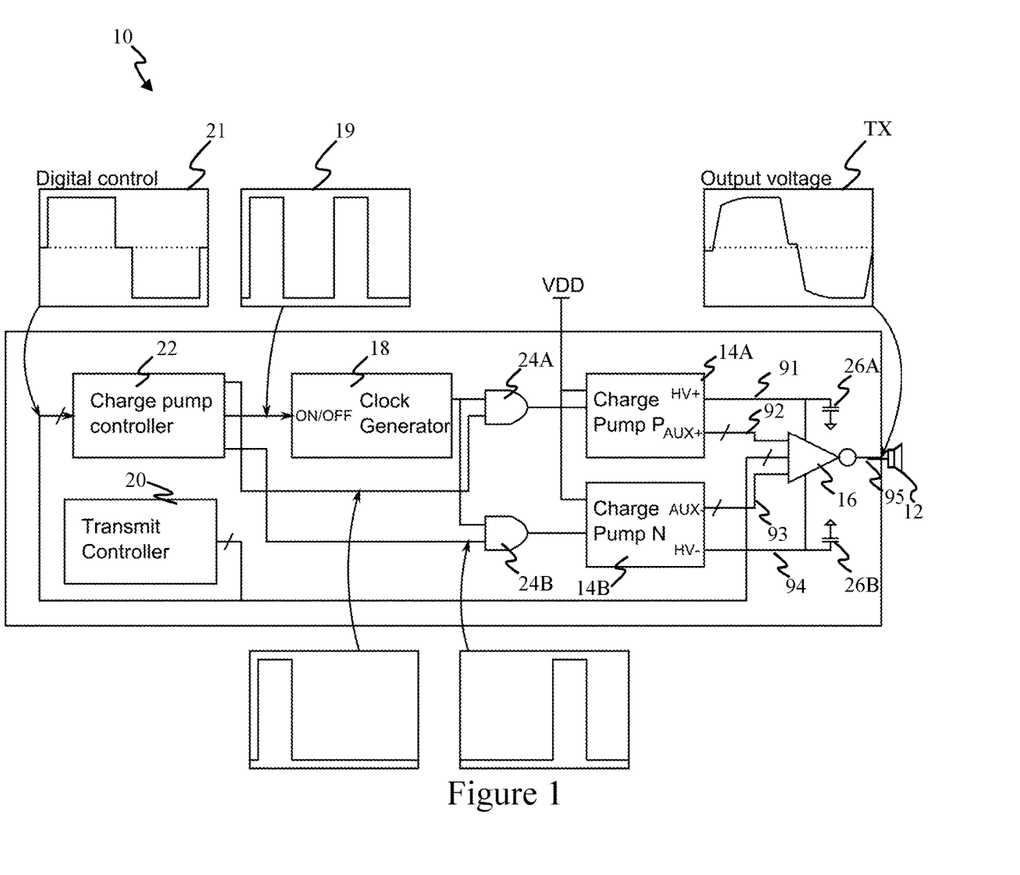
FIG. 1 is a block diagram of an ultrasound transmitter system according to an aspect of the present disclosure showing examples of key waveforms.

FIG. 1 shows a block diagram of an ultrasonic transmitter circuit 10 according to an aspect of the present disclosure. In this example, an ultrasonic transducer 12 is to be driven with a 3-level high voltage square wave. The high voltage may be generated on chip by a driving circuit having two charge pumps 14A, 14B that connect to a multilevel inverter 16 that produces an output voltage TX that drives the transducer 12. By way of example and not by way of limitation, both charge pumps may be turned on simultaneously while supplying the high voltage transmit waveform to the ultrasonic transducer 12 but are otherwise turned off.

Figure 5:
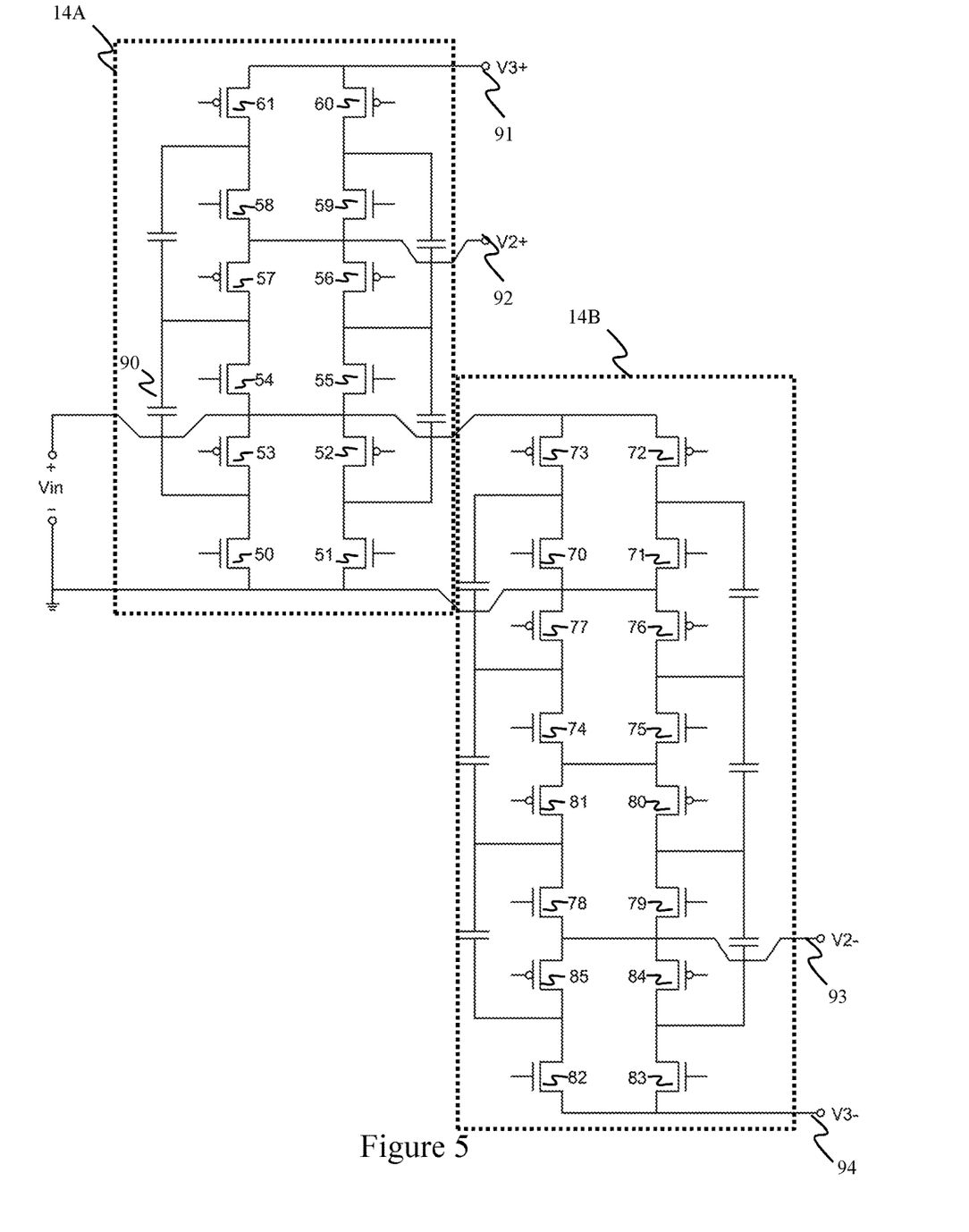
FIG. 5 is a schematic diagram of an example of charge pumps implemented using a symmetric ladder topology for the ultrasound transmitter system of FIG. 1.

The charge pumps 14A, 14B respectively provide positive and negative high voltage outputs HV+, HV−. Depending on implementation, the charge pumps 14A, 14B may also produce intermediate voltage levels that are used by the multilevel inverter 16. FIG. 5 shows an example implementation of the charge pumps. In the illustrated example, each charge pump 14A, 14B is a symmetric ladder type converter. Outputs V3+ and V3− are the positive and negative high voltage outputs, corresponding to HV+ and HV− in FIG. 1. Outputs V2+ and V2− may be used as auxiliary outputs, for example, to drive the gates of the high voltage transistors in the multilevel inverter 16 in FIG. 1.

Figure 6:
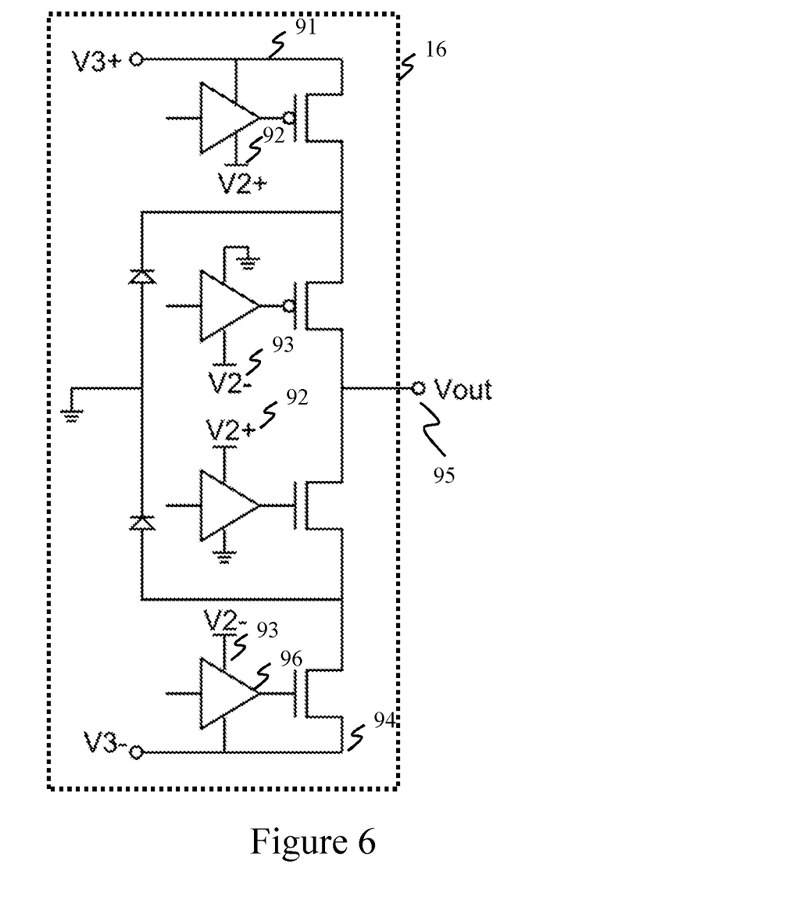
FIG. 6 is a schematic diagram of an example of a multi-level inverter for the ultrasound transmitter system of FIG. 1.

FIG. 6 shows an example implementation of the multi-level inverter 16. In this example, the illustrated inverter is implemented with a diode-clamped topology and can produce voltages V3+, 0, or V3− at an output 95. The multilevel inverter 16 connects to the charge pumps 14A and 14B through voltages 91, 92, 93, and 94. The voltages 91 and 94 are HV+ and HV−, respectively; these are used to drive the transducer 12. The voltages 92 and 93 are auxiliary voltages produced by the charge pumps. These are used to drive the gates of the transistors of the multilevel inverter 16. This results in lower power consumption, as the gate drive does not require a full voltage swing from HV+ to HV−. The gate drive buffers 96 operate off of the auxiliary voltages. In practice, the control signal to the gate drive buffers 96 needs to be level shifted to the appropriate baseline level. A common approach to implement this is to use AC coupling with a DC level restore.

Referring to FIG. 1, a clock generator 18 sets a switching frequency of the charge pump and can be disabled with a digital control signal 19 from the charge pump controller 22 when not used. The clock generator 18 may be implemented in the form of some type of hardware-oscillator, with the ability to be turned on or off. If this requires fast start-up time, an RC oscillator may be used. Alternatively, a crystal or MEMS timing device may be used as the clock generator 18.

A transmit controller 20 generates a digital representation of the 3-level square wave 21, sometimes called a digital transmit waveform. In one implementation, the transmit controller 20 may generate a bandpass pulse-width-modulated (BP-PWM) waveform. This type of modulation allows control over the phase and amplitude of the transmit waveform, while needing only a few discrete voltage levels, and thus is compatible with a 3-level square wave.

Figure 3:
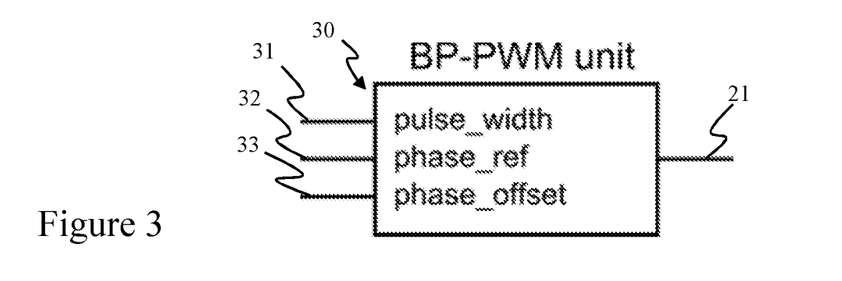
FIG. 3 is a block diagram of an example of a bandpass pulse-width-modulated (BP-PWM) unit that may be used as the transmit controller in the ultrasound transmitter system of FIG. 1.
Figure 4:
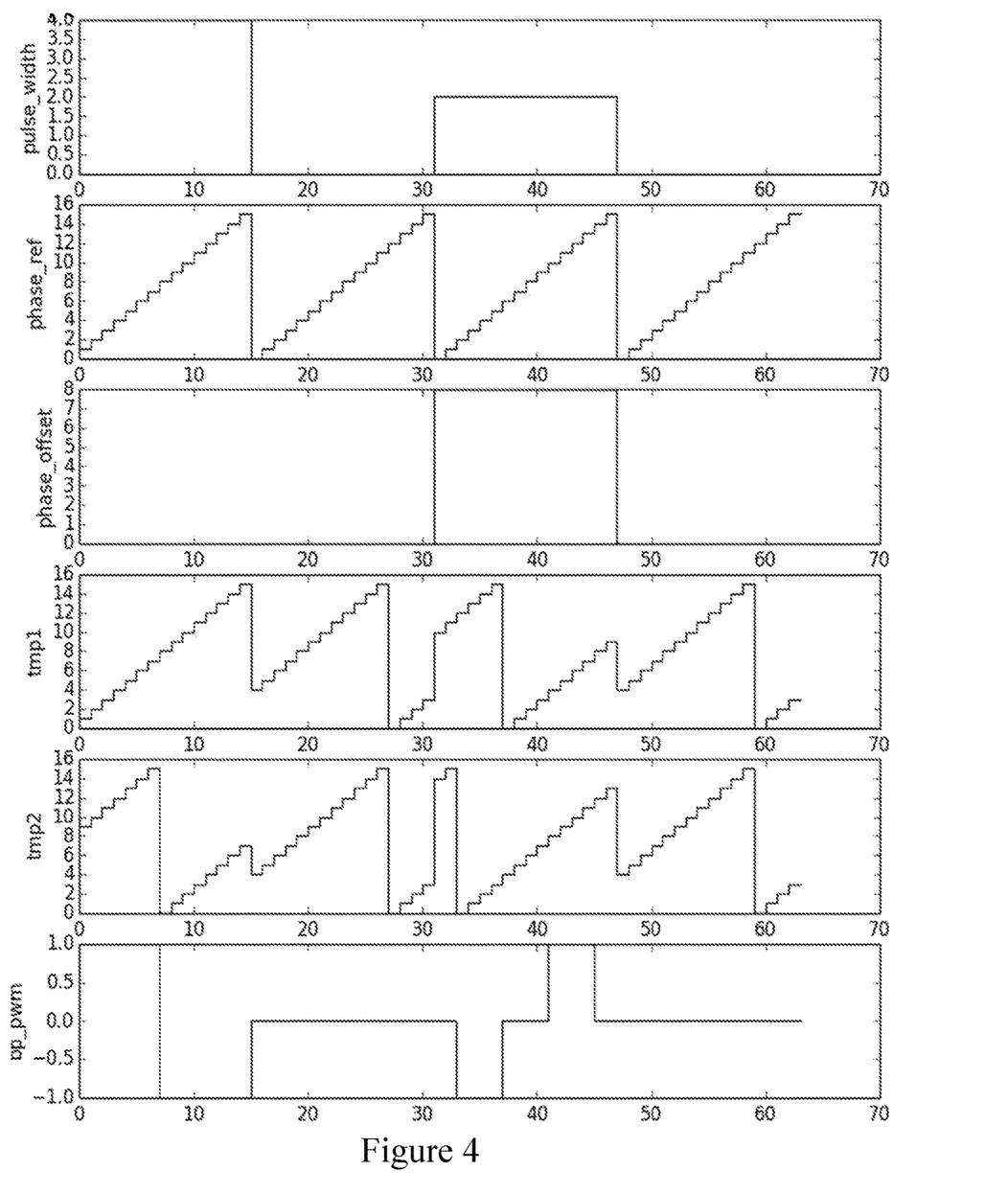
FIG. 4 is a set of flow diagrams illustrating operation of the BP-PWM unit of FIG. 3.

FIG. 3 depicts an example of a BP-PWM unit 30 that may be used as the transmit controller 20 in FIG. 1. The BP-PWM unit 30 determines the output voltage level based on the pulse-width setting 31, phase reference 32, and phase offset 33. In practice, the inputs 31, 32, and 33 may be provided by a higher level controller, for example, a microcontroller or a digital state machine. One implementation of a BP-PWM unit 30 uses the algorithm described below to produce the modulated output. The algorithm is intended to be representative of the signal processing required to produce the desired waveform and is not the only possible implementation. In this particular algorithm, pulse width is 3 bits, phase_ref is 4 bits, phase_offset is 4 bits, and bp_pwm is 2 bits. FIG. 4 shows the operation of the algorithm.

input [2:0] pulse_width;
input [3:0] phase_ref;
input [3:0] phase_offset;
wire [3:0] tmp1, tmp2;
output [1:0] bp_pwm;
assign tmp1=4−pulse_width+phase_ref+phase_offset;
assign tmp2=4+pulse_width+phase_ref+phase_offset;
assign bp_pwm=tmp2[3]−tmp1[3];

Referring to FIG. 1, the digital transmit waveform 21 feeds into the multilevel inverter 16 and a charge pump controller 22. The multilevel inverter 16 is a type of digital to analog converter: it converts an input digital transmit waveform into a high-voltage analog waveform. The charge pump controller 22 is responsible for turning on and off the charge pumps 14A, 14B synchronously with the digital transmit waveform 21.

Also shown in FIG. 1 are clock gating elements 24A, 24B and filter capacitors 26A, 26B. The clock gating elements serve to individually disable the charge pumps. The filter capacitors 26A, 26B prevent the charge pump voltage from completely collapsing to zero when the ultrasonic transducer is connected to either the positive or negative charge pump outputs.

Maximizing Charge Pump Efficiency

By way of example, and not by way of limitation, the charge pumps 14A, 14B may be implemented as switched-capacitor DC-DC converters. This type of converter uses capacitors to shuffle charge from an input power supply to an output load, e.g., the ultrasonic transducer 12 in this example. The basic principle is to charge a capacitor from the input source and then discharge it across the output. There are several possible topologies for creating different ratios of output to input voltage. For example, several capacitors can be charged from an input source in parallel, and then the capacitors can be connected in series and connected across the output load. This is known as a series-parallel topology and is one method of creating a step-up converter.

In the symmetric ladder depicted in FIG. 5, the state of the switches may be controlled by a charge-pump clock, produced by 18 and gated by 24A and 24B. If the clock is high, the even-numbered switches are on and the odd-numbered switches are off. If the clock is low, the opposite is true. The result is that charge is shuffled from the input source Vin to the outputs V2+, V3+, V2−, and V3− by the flying capacitors 90 while the charge pump clocks are active. In this particular topology, V2 will be about twice Vin, and V3 will be 3 times as large as Vin. The converters can be shut-down individually by using the gates 24A and 24B.

In switched-capacitor DC-DC converters, charge is transferred to the output load in discrete packets that occur during the switching transition. For example, a shuffling capacitor has previously been connected across an input voltage source and is now fully charged. The capacitor is then disconnected from the input source and connected across the output load. The charge transfer to the output happens almost instantaneously when the shuffling capacitor is connected to the output load.

In active operation, the shuffling capacitor periodically switches from the input to the load at frequency typically in the range of 10 kHz to 100 MHz. While the charge pump is active, the shuffling capacitors are repeatedly charged from the input and discharged to the output.

If the output load is a capacitor, as is the case when driving an ultrasonic transducer, the load capacitor will charge while the charge pump is active. The load capacitor's final voltage will be determined by the step-up ratio of the charge pump. When the capacitor is nearly fully charged, the converter can no longer deliver significant output charge. Further switching action only serves to balance charge on the internal capacitors of the charge pump and does not produce any useful output. Even though the charge pump ceases to produce useful output, there is still energy lost due to the effort required to switch all the internal capacitors. Therefore, it is desirable to place the charge pump into an idle state when the load capacitor reaches a desired output voltage. When the charge pump is placed into an idle state, the load capacitor ceases to charge, and the output voltage becomes constant.

In this application, the capacitive load is an ultrasonic transducer. The transducer may be driven with a square wave. The transducer driving voltage is periodically switched between the HV+, HV−, and zero levels. Thus, the capacitive load that the ultrasonic transducer 12 presents must be frequently charged and discharged, and the above described behavior will apply on a periodic basis.

The peak-to-peak voltage of the transmit waveform (output of the multilevel inverter 16) can be adjusted by changing the amount of time the charge pump is active on each output load switching event. If the active time is longer, the peak-to-peak voltage will be higher. The maximum peak-to-peak voltage is generally limited by the peak-to-peak difference between the positive and negative charge pump high voltage outputs.

Phases of the Transmit Waveform

As shown in FIG. 1, the clock generator circuit 18 is turned on for a programmable amount of time, referred to as the active time, at each zero-to-high or zero-to-low edge transition of the digital transmit waveform 21. The clock generator 18 is disabled at other times in order to save power by turning off charge pumps 14A, 14B. The positive charge pump (Charge pump P 14A) is turned on at a zero-to-high transition of the digital transmit waveform, and the negative charge pump (Charge pump N 14B) is turned on at a zero-to-low transition. This results in a distinct transmit waveform (output of multilevel inverter 16) with several characteristic phases identified in FIG. 2.

In phase 1, the transmit waveform (FIG. 2, top) starts at the zero level. Depending on the multilevel inverter topology, there may be a small offset, shown as a negative offset in FIG. 2. The charge pump outputs (FIG. 2, bottom) are stable at the voltage level at which they were switched off.

Figure 2:
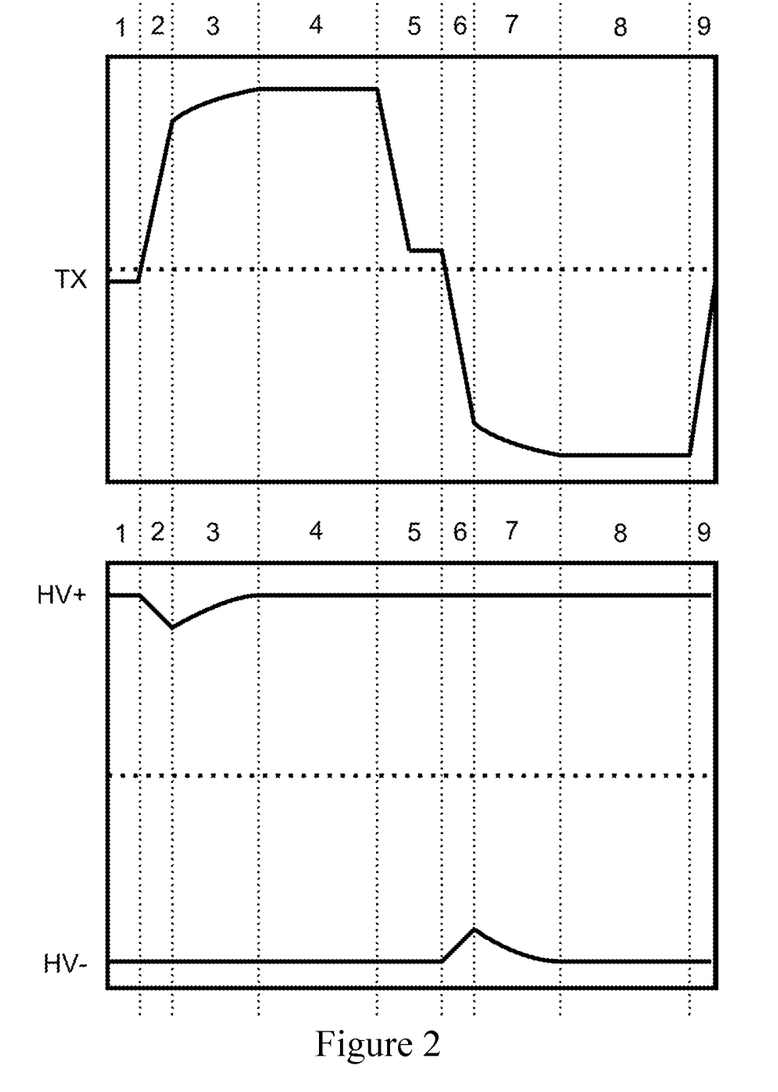
FIG. 2 is a timing diagram depicting transmit and charge pump waveform detail during operation of the ultrasound transmitter system of FIG. 1.

During phase 2, the multilevel inverter 16 connects the initially discharged load capacitor to the positive high voltage rail (HV+). At the same time, the positive charge pump 14A is enabled for the active time. The initial charging will have a fast response up to a certain amplitude that depends on the amount of filtering capacitance 26A at the output of the charge pump 14A. The positive charge pump output will decrease due to charge sharing between the capacitive load (e.g., the transducer 12) and filter capacitor 26A.

During phase 3, the positive charge pump 14A is still active, but the initial response due to charge sharing with the filter capacitor 26A has completed. The positive charge pump 14A is now charging the load and filter capacitors.

During phase 4, the positive charge pump 14A is in the idle state. The output voltage TX stops charging as soon as the positive charge pump 14A goes into the idle state. The amplitude of the voltage in phase 4 will increase with the charge pump active time.

During phase 5, the digital transmit waveform 21 transitions to the 0 level. This causes the multilevel inverter 16 to transition the output to zero. There may be a small offset depending on the topology of the multilevel inverter. The charge pump outputs are stable at the voltage level at which they were switched off.

During phase 6, the multilevel inverter connects the initially discharged load capacitor to the negative high voltage rail (HV−). At the same time, the negative charge pump 14B is enabled for the active time. The initial charging will have a fast response up to a certain amplitude that depends on the amount of filtering capacitance 26B at the output of the negative charge pump 14B. The negative charge pump output will increase due to charge sharing between the load and filter capacitances.

During phase 7, the negative charge pump 14B is still active, but the initial response due to charge sharing with the filter capacitor 26B has completed. The charge pump is now charging the load and filter capacitors.

During phase 8, the negative charge pump 14B is in the idle state. The output voltage TX stops charging as soon as the negative charge pump 14B goes into the idle state. The amplitude of the voltage in phase 8 will increase with the charge pump active time.

During phase 9, the digital transmit waveform 21 transitions to the 0 level. This causes the multilevel inverter 16 to transition the output to zero. There may be a small offset depending on the topology of the multilevel inverter.

The system 10 may be designed such that each charge pump is only active when needed to produce the required high voltage output to be applied to transducer 12. For the purposes of example and not limitation, the positive high voltage charge pump 14A may be active when transducer 12 is driven with positive high voltage HV+. Similarly, the negative high voltage charge pump 14B may be active when transducer 12 is driven with negative high voltage HV−. Otherwise power would be wasted running the charge pumps when it is not necessary to do so. Furthermore, the transducer 12 may operate in both a transmit phase and a receive phase. The charge pumps 14A, 14B may be turned off during the receive phase to reduce noise. It is noted that aspects of the present disclosure include implementations in which the driving circuit includes a single charge pump, a single clock gating element, and a single filter capacitor.

In the above description certain components of the transmitter circuit 10 are implemented by hardware components, e.g., the charge pump controller 22, transmit controller 20, and clock generator 18. Aspects of the present disclosure are not limited to only such implementations. Aspects of the present disclosure include implementations in which at least some features of the transmitter circuit 10, e.g., some of the functions of the charge pump controller 22, transmit controller 20, or the clock generator 18, or generation of the digital control signal 19 are implemented at least partly in software operating on a programmable processor.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein. The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC § 112(f). In particular, the use of "step of" in the claims herein is not intended to invoke the provisions of 35 USC § 112(f).

The invention claimed is:

1. An ultrasonic transmitter system comprising an integrated circuit and ultrasound transducer, wherein the integrated circuit comprises one or more charge pumps coupled to a multi-level inverter, wherein the one or more charge pumps operate with a timing that is based on a specific transmit waveform applied to the ultrasound transducer.

2. The system of claim 1, wherein the charge pumps are configured to be active only when required to apply the specific transmit waveform to the ultrasound transducer.

3. The system of claim 1, further comprising a clock generator configured to set a switching frequency of the one or more charge pumps.

4. The system of claim 3, wherein the clock generator is configured to be disabled by a digital control signal.

5. The system of claim 1, wherein the one or more charge pumps are implemented as switched-capacitor DC-DC converters.

6. The system of claim 1, wherein the one or more charge pumps include a first charge pump configured to produce a positive driving voltage output and a second charge pump configured to produce a negative driving voltage output.

7. The system of claim 1, further comprising one or more clock gating elements configured to selectively disable the one or more charge pumps.

8. The system of claim 7, further comprising a charge pump controller and a clock generator coupled to the one or more clock gating elements, wherein the one or more clock gating elements are configured to selectively disable the one or more charge pumps in response to signals from the charge pump controller and clock generator.

9. The system of claim 1, wherein the one or more charge pumps are implemented using a symmetric ladder topology.

10. A driver circuit for an ultrasonic transducer, comprising one or more charge pumps and a multi-level inverter, wherein the one or more charge pumps are configured to drive the ultrasound transducer only during output transitions of the inverter.

11. The driver circuit of claim 10, further comprising a clock generator configured to set a switching frequency of the one or more charge pumps.

12. The driver circuit of claim 11, wherein the clock generator is configured to be disabled by a digital control signal.

13. The driver circuit of claim 10, wherein the one or more charge pumps are implemented as switched-capacitor DC-DC converters.

14. The driver circuit of claim 10, wherein the one or more charge pumps include a first charge pump configured to produce a positive driving voltage output and a second charge pump configured to produce a negative driving voltage output.

15. The driver circuit of claim 10, further comprising one or more clock gating elements configured to selectively disable the one or more charge pumps.

16. The driver circuit of claim 15, further comprising a charge pump controller and a clock generator coupled to the one or more clock gating elements, wherein the one or more clock gating elements are configured to selectively disable the one or more charge pumps in response to signals from the charge pump controller and clock generator.

17. The driver circuit of claim 10, wherein the one or more charge pumps are implemented using a symmetric ladder topology.

* * * * *